United States Patent [19]

Sawyer et al.

[11] Patent Number: 4,971,662

[45] Date of Patent: Nov. 20, 1990

[54] HYDROMETALLURGICAL RECOVERY OF METAL VALUES FROM COOPER CONTAINING SULPHIDE MATERIALS

[75] Inventors: Hugh D. Sawyer, Wanganui; Raymond W. Shaw, Port Pirie, both of Australia

[73] Assignee: The Broken Hill Associated, Victoria, Australia

[21] Appl. No.: 15,533

[22] Filed: Feb. 13, 1987

Related U.S. Application Data

[63] Continuation of Ser. No. 518,399, Jul. 29, 1983, abandoned.

[30] Foreign Application Priority Data

Aug. 10, 1982 [AU] Australia .................. PF5311

[51] Int. Cl.$^5$ .................. G01G 3/05; G01G 9/04; C25C 1/12; C22B 3/06
[52] U.S. Cl. .................. 204/107; 75/743; 204/108; 204/118; 204/119; 423/27; 423/38; 423/39; 423/99; 423/109
[58] Field of Search .................. 423/24, 38, 39, 99, 423/109; 75/101 R, 114, 117, 120; 204/107, 108, 118, 119

[56] References Cited

U.S. PATENT DOCUMENTS

| | | | |
|---|---|---|---|
| 699,326 | 5/1902 | Irvine | 423/38 |
| 2,992,894 | 7/1961 | Hazen et al. | 423/24 |
| 3,896,208 | 7/1975 | Dubeck et al. | 75/101 R |
| 4,107,009 | 8/1978 | Everett | 423/38 |
| 4,288,304 | 9/1981 | DeMarthe et al. | 423/109 |
| 4,423,011 | 12/1983 | Baglin et al. | 423/22 |

FOREIGN PATENT DOCUMENTS

| | | |
|---|---|---|
| 46913 | 9/1922 | Australia . |
| 58205 | 7/1973 | Australia . |
| 69680 | 6/1974 | Australia . |
| 72832 | 8/1974 | Australia . |
| 10711 | 2/1976 | Australia . |
| 15094 | 6/1976 | Australia . |
| 28284 | 8/1977 | Australia . |
| 31357 | 12/1977 | Australia . |

*Primary Examiner*—Jeffery E. Russel
*Attorney, Agent, or Firm*—Finnegan, Henderson, Farabow, Garrett & Dunner

[57] ABSTRACT

A process for the hydrometallurgical recovery of metal value, particularly copper, from copper-containing sulphide materials in which the material is conventionally ground and reacted with a solution containing less than 3 moles per liter of chloride ion, and optionally as little as 15 g/liter, together with sulphate ions with continuous oxygen injection and vigerous agitation. The reacting may be carried out at a pH in the range of 0.5–4, at moderate pressure as low as atmospheric pressure and at a moderate temperature below the boiling point of the solution such as 85° C.

11 Claims, 7 Drawing Sheets

TWO STAGE LEACH CIRCUIT

```
         COPPER CONCENTRATES
                  │
                  ▼                    26.4% Cu
              ┌───────┐                30.1% Fe
      ┌──────▶│ GRIND │                33.0% S
      │       └───────┘
      │           │
      │           ▼
  H₂SO₄ ┐    ┌──────────┐
   O₂   ├───▶│ ACID LEACH│◀────
  NaCl/HCl┘  └──────────┘
                  │
                  ▼
            ┌──────────────┐
            │ SOLID/LIQUID │
            │ SEPARATION   │
            └──────────────┘
              │         │
   IRON-FREE RESIDUE   SULPHIDES
              │        RECYCLED
              ▼
   SULPHUR/METAL
   VALUES RECOVERY
              │
              ▼
      ┌──────────────┐
      │ NEUTRAL LEACH│◀── O₂
      └──────────────┘
    40g/L Cu⁺⁺│
              ▼
      ┌──────────────┐    ┌──────────────────┐
      │ SOLID/LIQUID │───▶│ SULPHIDE/OXIDE   │
      │ SEPARATION   │    │ SEPARATION       │
      └──────────────┘    │ eg FLOTATION     │
              │           └──────────────────┘
              │                    │
              ▼              OXIDE RESIDUE
      ┌──────────────┐
      │COPPER SOLVENT│
      │ EXTRACTION   │  15g/L Cu⁺⁺
      └──────────────┘
              │
              ▼
      ┌──────────────┐
      │ ELECTROWINNING│
      └──────────────┘
              │
              ▼
         COPPER METAL
```

FIG. 7.

HYDROMETALLURGICAL RECOVERY OF METAL VALUES FROM COOPER CONTAINING SULPHIDE MATERIALS

This application is a continuation of application Ser. No. 06/518,399, filed Jul. 29, 1983, now abandoned.

This invention relates to a hydrometallurgical process for the treatment of copper bearing sulphide materials, and is particularly concerned with the leaching process thereof.

Recovery of metal value from copper bearing sulphide materials has traditionally been carried out by pyrometallurgical processes, but these suffer serious environmental and economic disadvantages, among which may be mentioned:

(i) emission of sulphur dioxide and other sulphur compounds;

(ii) the processes are capital intensive when operated on a small scale; and (iii) base metals other than copper are difficult to recover.

Hydrometallurgical routes have been investigated for many years but commercialization has been very limited. Foremost amongst these developments have been:

(i) Cupric chloride - hydrochloric acid leaching of sulphides to produce cuprous chloride and elemental sulphur. The cuprous chloride is then either electrowon (as in the processes described in U.S. Pats. No. 507,130 and 3,785,966), reduced with hydrogen (as in the described in U.S. Pat. No. 3,673,061) or oxidized to cupric chloride and transferred to a sulphate solution by solvent extraction for conventional electrowinning (see for example Australian Patent No. 489,650, thus utilizing two distinct steps in the leaching process;

(ii) Ferric chloride - hydrochloric acid leaching with copper recovery as in the cupric chloride systems, see for example U.S. Bureau of Mines R.I. 8007 (1975) and U.S. Pat. No. 3,798,026 Milner et al;

(iii) Ammonia leaching as in the process described in Australian Patent Specification No. 52833/73;

(iv) Oxidative pressure leaching in sulphate solution at elevated temperatures and pressures as in the process described in Canadian Patent No. 618,623; and (v) Oxidative pressure leaching in chloride solutions at elevated temperatures and pressures (see U.S. Bureau of Mines R.I. 8290, 1978).

Hybrid processes involving a pyrometallurgical treatment such as reduction roasting chlorination roasting or oxidation roasting followed by a leaching step have also been developed (see for example U.S. Bureau of Mines R.I. 7996 (1975) and R.I. 8067 (1975)).

All of the processes developed to date suffer from one or more inherent disadvantages which have deterred from their widespread commercial utilization. In the case of solely hydrometallurgical processes it has been largely a combination of poor recovery and/or poor product purity and/or high reagent consumption. Coupled with this have been difficulties with balancing water inputs, high capital costs of exotic construction materials and problems of producing residues suitable for disposal or further treatment.

In particular in the chloride solution hydrometallurgical processes it has been necessary to maintain relatively high chloride levels in order to ensure sufficient acidity in the solution and complete complexing of cuprous ions to retain the cuprous ions in solution. High chloride levels tend to disadvantage the hydrometallurgical process as a whole in terms of reagent losses, washing problems in the solvent extraction circuit, and actual chemical behaviour in the solvent extraction circuit. It has also often been found necessary hitherto to perform the leaching process in conditions of high pressure and/or temperatures.

The present invention differs quite markedly from all previous developments. We have found that contrary to expectations and the reported results of other investigators, we can chemically attack copper bearing sulphide materials, effecting good recoveries of copper and/or other metals present, in a chloride containing solution at moderate pressure and temperature.

The invention accordingly provides a process for the hydrometallurgical recovery of copper from copper-containing sulphide materials, in which the said materials are leached in an acid solution containing cupric chloride and sulfate ions with injection of oxygen and stirring to maintain the materials in suspension in the solution and to disperse the oxygen in the solution. The chloride is maintained in the solution at a concentration of from about 15 grams per liter to about 100 grams per liter.

Further according to the present invention, the copper-containing solution is separated from a solid residue of the leaching process, the metal value is partially transferred into an organic solution which is then contacted with an acidic sulphate solution into which the metal value is partially transferred and the resulting metal bearing sulphate solution is subjected to electrolysis to recover the metal. The recovered metal value may be copper alone or it may comprise zinc, for example, if this was present in the sulphide materials. The recovery of a particular metal value from the solution may depend on the concentration and general economics of recovering that metal.

By the present invention, the copper is leached into solution in the oxidized, more readily soluble cupric ion state which can then readily be transferred to a sulphate solution using conventional solvent extraction techniques as described above. This regenerates the leach solution which may be returned to the reactor. The high solubility of $Cu^{++}$ avoids the necessity for high $Cl^-$ levels to maintain the copper in solution. As previously indicated the high levels of chloride ions previously proposed present disadvantages to the hydrometallurgical process as a whole in terms of reagent losses, washing problems in the solvent extraction circuit, and actual chemical behaviour in the solvent extraction circuit. Preferably the chloride ion concentration is less than 75 g/L and normally will be less than 60 g/L.

The chemistry governing the leach reaction is effectively $$(Cu-S) + 2H^+ + \tfrac{1}{2}O_2 \rightarrow Cu^{++} + H_2O + S^° \qquad (I)$$

carried out in the presence of $Cu^{++}$ and some $Cl^-$, where $(Cu-S)$ is the copper-containing sulphide material.

Hydrogen ion necessary for reaction (I) may be provided by maintaining the acidity below pH 4, most preferably between pH 1 and 2. The pH is preferably not below 0.5. Although this is not critical to the leaching step, lower pH is undesirable because of its effect on the later stages of the hydrometallurgical process.

The $Cu^{++}$ level in the solution is not critical and the actual concentration chosen is optimized having regard to subsequent processing steps.

The ability to carry out the leach at relatively low acidities is important in that regeneration of a strong acid solution e.g. HCl, is unnecessary with the copper depleted stream returned from solvent extraction advantageously being sufficiently acidic to maintain the desired pH. Acid additions accordingly may be limited solely to those necessary to counteract losses from the circuit through entrainment in residue and attack of gangue materials. We have found it is preferable to add additional acid in the form of sulphuric acid to maintain the acidity as acid is absorbed, rather than use HCl.

With some sulphide materials, e.g. complex copper-lead-zinc concentrates and copper-lead matte, the chloride level can be as low as 15 g/L with the bulk of the acidity being supplied by sulphuric acid.

In a preferred embodiment of the invention, sulphuric acid is used as a source of hydrogen ion. In addition to the economic advantage, presence of sulphate ions improves the extraction efficiency of the extractant in the subsequent extraction step. However, we have found that chloride ion cannot be entirely replaced by the cheaper sulphate ion. The relative levels of sulphate and chloride ions will depend upon the nature of the starting material. For example, leaching rates of some copper concentrates are retarded by the presence of more than about 4 g/L sulphate in a solution containing 50 to 100 g/L chloride, whereas other concentrates, such as copper/lead matte or complex Cu-Pb-Zn concentrates, can be leached in solutions containing large amounts, e.g. 70 g/L sulphate, and relatively low amounts, e.g. 20 g/L chloride.

We have found that in order to maintain the chloride ion concentration in the leaching solution, which is generally depleted through losses in the system, it is preferable to add additional chloride ions in the form of a relatively cheap metal salt, such as sodium chloride. The relative addition of sulphuric acid and a metal chloride to the leaching solution will generally depend on the magnitude of the losses of the respective chemical species from the solution. If sulphate losses are low and bleed of the sodium, or whatever other metal is used in the metal salt, from the solution is insufficient, at least part of the additional reagent make-up to maintain chloride and hydrogen ion levels may comprise hydrochloric acid.

The leaching process of the present invention is mainly designed for extracting copper and we have found that it may extract more than 90 % of the copper to solution. The behaviour of other metals varies somewhat dependent upon the actual solutions used. Of the base metals, lead and zinc are both attacked as is the majority of the iron. More than 90 % of any zinc present may be extracted and residues containing for example nickel, lead, silver, gold and/or cobalt may be obtained from the copper-containing sulphides.

Virtually all the sulphur present reports in the elemental form.

High concentration of iron is not necessary and preferably should be avoided, and it should be noted that there is no addition of iron at any stage of the process.

It is an advantage of the leaching process of the present invention that it may be conducted at a pressure not exceeding 25 psi above atmospheric pressure, and for convenience of operation at atmospheric pressure. Clearly a higher pressure may also be used. Conveniently also, the process is conducted at a temperature below boiling point at the pressure utilized. Preferably the temperature range for the process is about 85° C. to 106° C.

In order to promote the process the sulphide material is advantageously finely ground. Such fine grinding may be to about 150 $\mu$m or less and preferably to 75 $\mu$m or less. The injected oxygen should be thoroughly dispersed in the solution and this is performed by vigorous agitation which also has the advantage of producing good solid-to-liquid contact of the sulphide material in the solution. The oxygen injection is preferably continuous although, if the oxygen flow is stopped, the reaction will continue until the available cupric ions have been reacted.

The leaching process is advantageously conducted in a single reaction vessel, but where it is done in two or more stages, oxygen should be injected at every stage.

Various hydrometallurgical processes in accordance with the invention will now be described by way of example. In the accompanying drawings, FIGS. 1–7 relate to Examples 1–7.

In general, the preferred process illustrated by any one of the Figures depends upon the value of metal other than copper in the copper-containing sulphide material being treated, and the preferred recovery system for these for any specific site being considered.

FIGS. 1–6 are all centred on a single leach step. In some cases there may be advantages in using a two stage circuit (such as shown in Flowsheet 7) analogous to the acid/neutral system used in zinc plants. Alternatively a separate residue leach process may be used to upgrade an iron-containing residue.

EXAMPLE (1)

Treatment of Copper Lead Matte from Lead Smelting Operations

Figure 1:
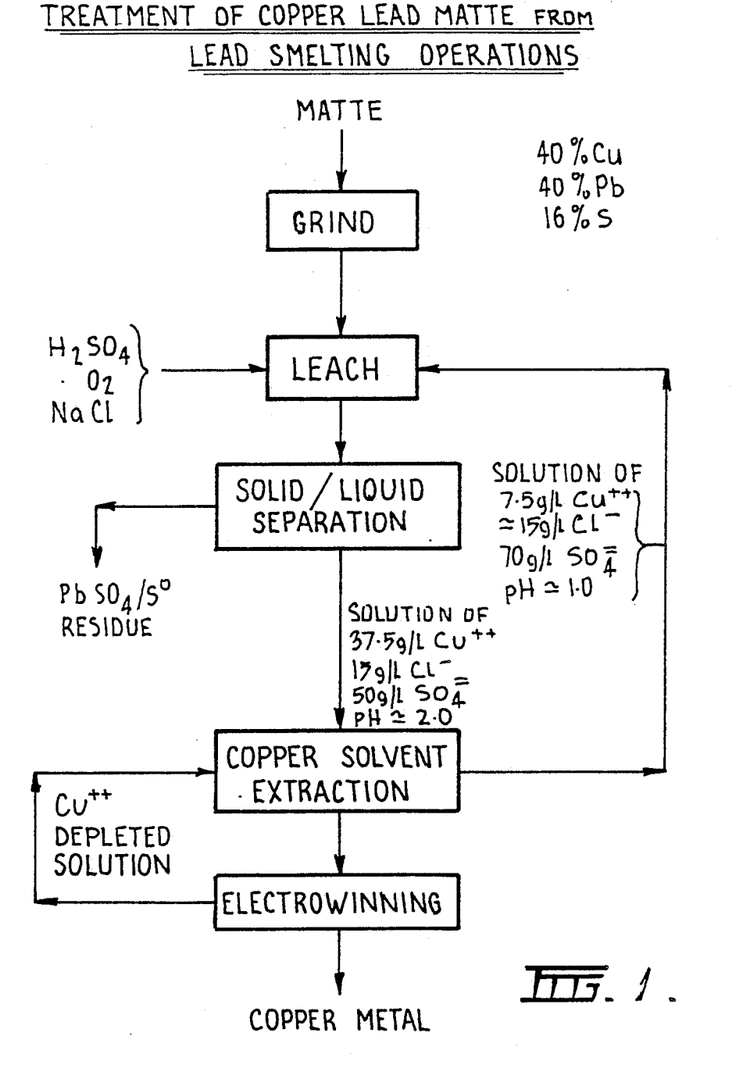
FIG. 1 illustrates hydrometallurgical extraction of copper from copper-lead matte obtained from lead smelting operations.

Process Description Referring to FIG. 1

1. The copper lead matte is ground conventionally to preferably <75 $\mu$m.

2. This matte is reacted with a solution containing $\simeq$7.5 g/L Cu$^{++}$, 15 g/L Cl$^-$ and 70 g/L SO$_4^=$ at a pH of $\simeq$1.0 at $\simeq$85° C. with vigorous agitation and continuous oxygen injection. The solution typically resulting from this has a composition of ≃37.5 g/L $Cu^{++}$, 15 g/L $Cl^-$ and 50 g/L $SO_4^=$ with a pH of 2-2.5. The extraction of copper to solution is 99 %. The lead sulphide in the copper lead matte is transformed to lead sulphate thus reducing the sulphate level in solution. Some $H_2SO_4$ is added to compensate for this loss.

3. The copper-containing solution is then separated from the solid residue using conventional metallurgical solid-liquid techniques and the copper extracted into an organic solution such as that provided by dispersing an organic solvent containing a mixture of nonyl phenol and 2-hydroxy, 4-nonyl salicylaldoxime in equal parts in a high flash point, narrow burning range hydrocarbon of a paraffin group in the ratio of 30% solvent 70% hydrocarbon. An example of such material is a mixture of 30% ACORGA P5100 in SHELLSOL 2046. See Shell Chemicals Technical Data Sheet PMCL 5147/2/79 "Shell Hydrocarbon Solvent Development Product Shellsol 2046" (September 1979) and "The ALCORGA P-5000 series; A Novel Range of Solvent-Extraction Reagents for Copper," A. Tumilty, Advances in Extractive Metallurgy, (1977). This causes the pH of the original aqueous solution to decrease to ≃1.0 and this solution is returned to the leach step. NaCl and $H_2SO_4$ are added to the solution to compensate for the physical and chemical losses of $H^+$, $Cl^-$, and $SO_4^=$.

4. The organic solution is then contacted with an acidic copper sulphate solution typically containing 30 g/L Cu as $CuSO_4$ and 180 g/L $H_2SO_4$. This solution strips the copper from the organic which then is recycled to extract more copper from the leach solution.

5. The copper bearing sulphate solution now containing ≃50 g/L Cu as $CuSO_4$ is subjected to electrolysis to recover copper as cathode and recycle the sulphate solution to step 4.

EXAMPLE (2)

Treatment of Copper-Lead-Zinc Concentrates

Figure 2:
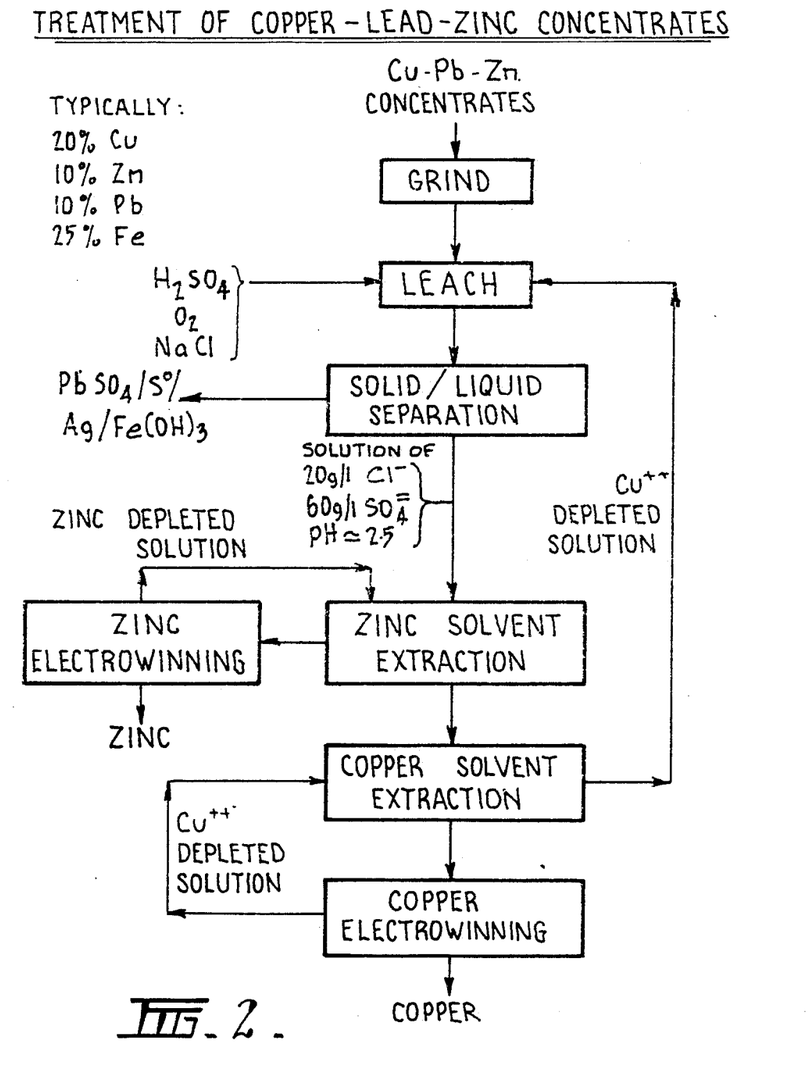
FIG. 2 illustrates the hydrometallurgical extraction of copper and zinc from copper-lead-zinc concentrates having a typical concentration of these metals and iron of 20% Cu, 10% Zn, 10% Pb and 25% Fe.

The process illustrated in FIG. 2 is as per the copper lead matte except that a zinc solvent extraction step is incorporated. An important feature of this process is the precipitation of iron during the leach step to prevent its interference with zinc solvent extraction. At an input pH of 2.5 to zinc solvent extraction the selectivity is excellent being of the order of 70:1 zinc to copper.

Variations of the depicted process are possible to separate the valuable metals (Pb, Ag and S°) from the iron if desirable. A sulphate releach and subsequent goethite or jarosite precipitation step is possible, analogous to processes commonly used in zinc hydrometallurgical plants.

EXAMPLE (3)

Treatment of Copper Dross (I)

Figure 3:
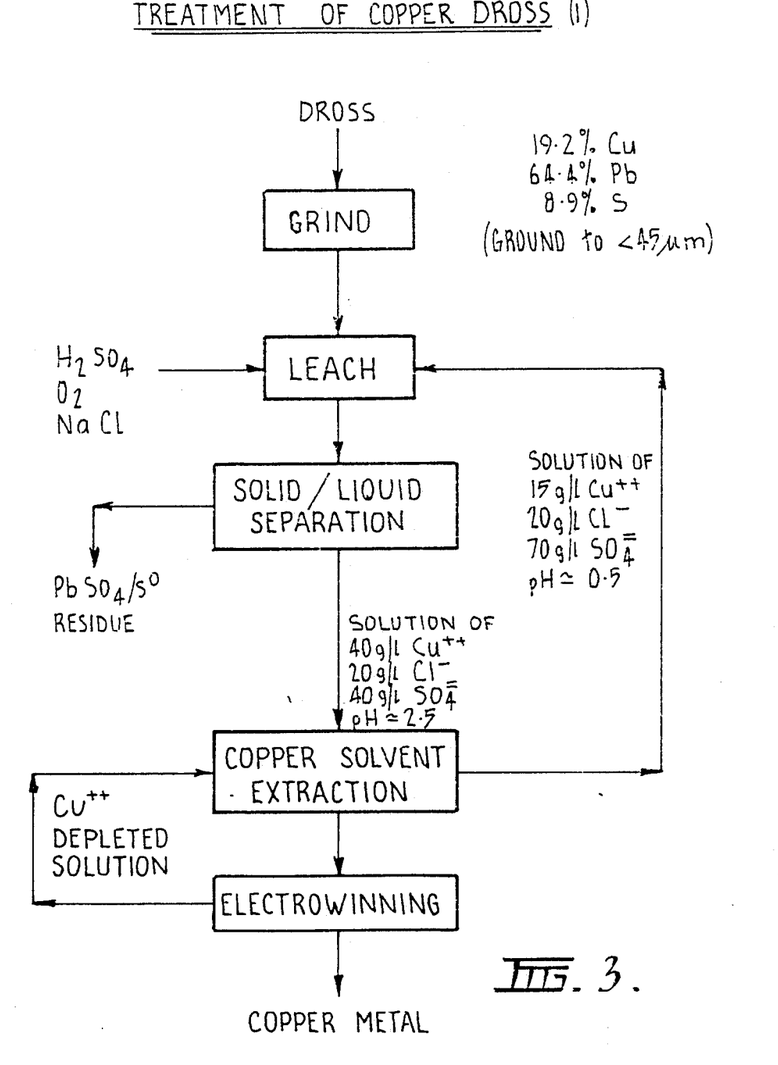
FIG. 3 illustrates the hydrometallurgical extraction of copper from copper dross including 19.2% Cu, 64.4% Pb and 8.9% S.
Figure 4:
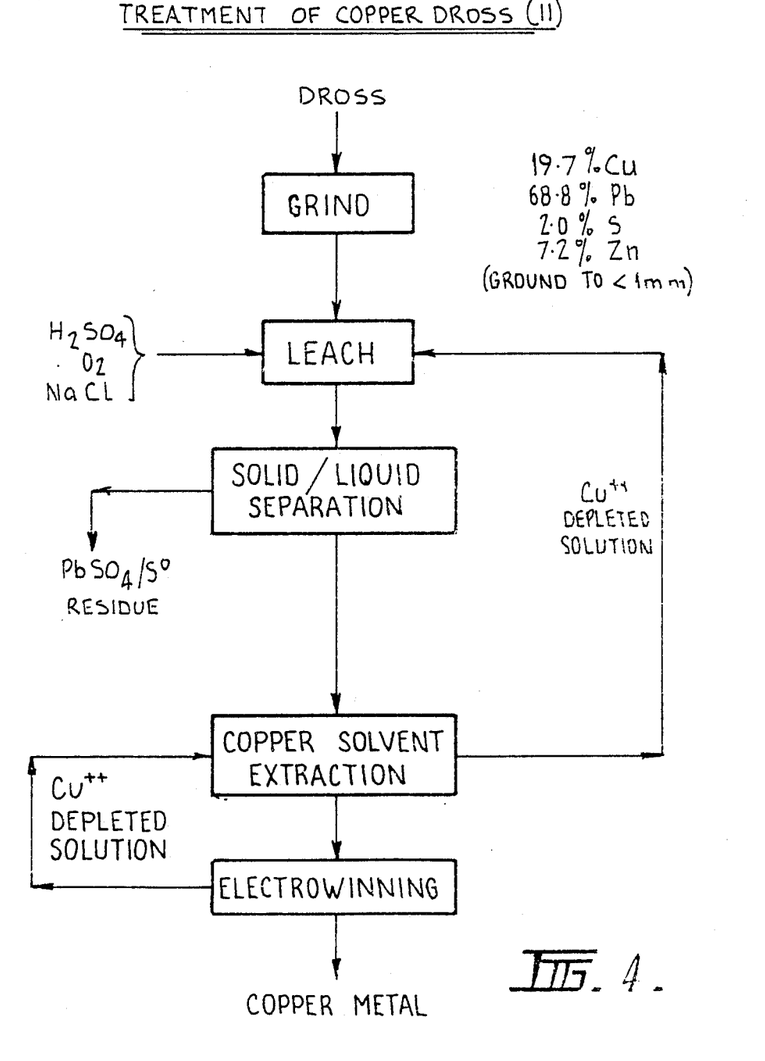
FIG. 4 illustrates the hydrometallurgical extraction of copper from copper dross including 19.7% Cu, 68.8% Pb, 2.0% S and 7.2% Zn.

The process illustrated in FIG. 3 is basically the same as that of FIG. 1 with different chemical conditions for the leach step. The solution in which the dross is leached contains approximately 15 g/L $Cu^{++}$, 20 g/L $CL^-$ and 70 g/L $SO_4^=$ at a pH of 0.5 and a temperature between 85° and 90° C. During the course of the reaction, the composition of the chemical species changes to approximately 40 g/L $Cu^{++}$, 20 g/L $Cl^-$ and 40 g/L $SO_4^=$. The final pH is approximately 2.5.

EXAMPLE (4)

Treatment of Copper Dross (II)

Figure 6:
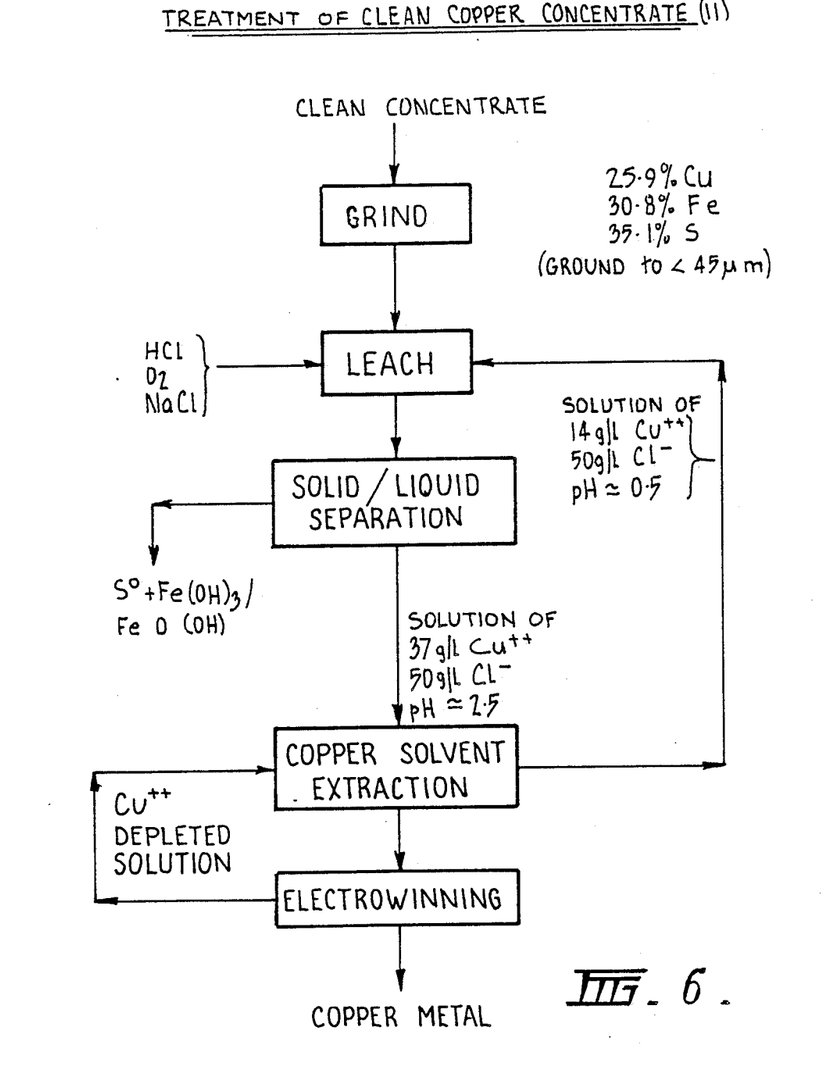
FIG. 6 illustrates the hydrometallurgical contraction of copper from clean copper concentrates including 25.9% Cu, 30.8% Fe and 35.1% S.

The process illustrated in FIG. 6 is basically the same as that of FIG. 3. The solution is slightly different in that the chloride ion concentration is maintained at 30 g/L $Cl^-$. Zinc may be separately removed by solvent extraction as in FIG. 2.

EXAMPLE (5)

Treatment of Clean Copper Concentrates (I)

Figure 5:
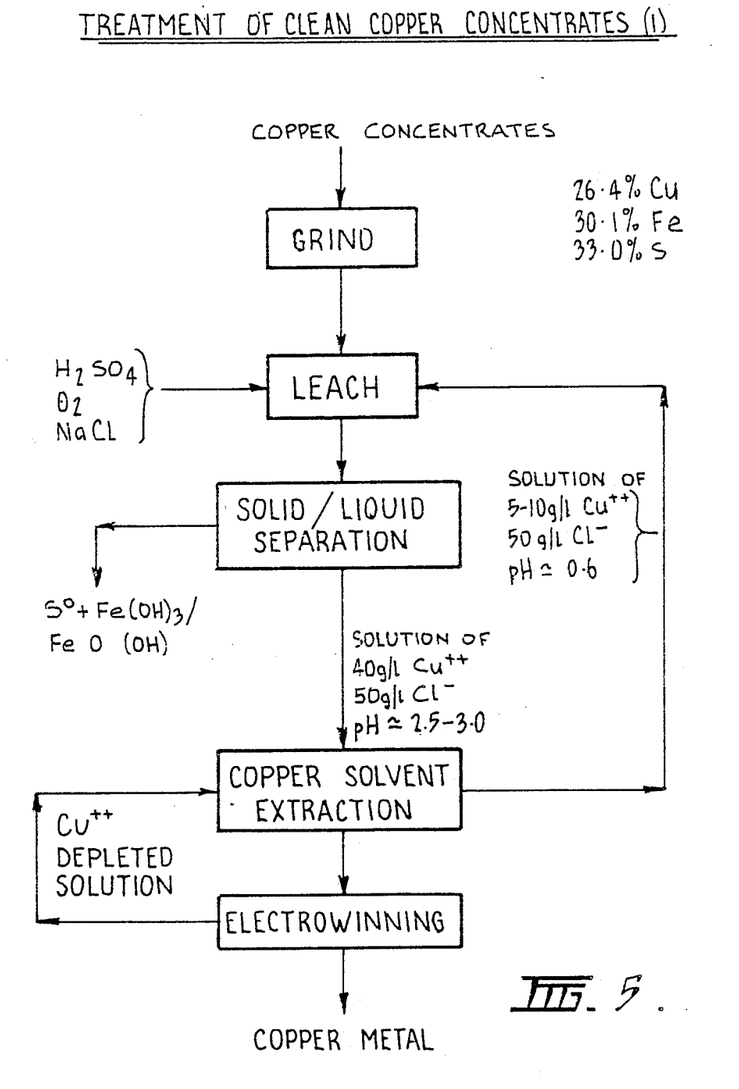
FIG. 5 illustrates the hydrometallurgical contraction of copper from clean copper concentrates including 26.4% Cu, 30.1% Fe and 33.0% S.

The process illustrated in FIG. 5 is basically the same as that depicted in FIGS. 1-4 but the chemical conditions pertaining in the leach step are somewhat different. The leach in this case commences at ≃90° C. by adding a solution containing ≃40 g/L $Cl^-$, 15 g/L $Cu^{++}$ and 50 g/L $SO_4^=$ at pH ≃0.5-1.0. During the course of the reaction this solution composition changes to approximately 40 g/L $Cu^{++}$, 40 g/L $Cl^-$, 50 g/L $SO_4^=$ and a pH of 1.5-2.0.

The final solution from leaching is most suitable for copper solvent extraction and regenerates the leach solution.

The residue generated, can be treated further to recover sulphur and valuable metals if desired and produce a separate iron residue for dumping.

EXAMPLE (6)

Treatment of Clean Copper Concentrate (II)

The process illustrated in FIG. 6 is basically the same as that depicted in FIGS. 1-5 but the chemical conditions for the leach step are different. The solution in which the material is leached contains approximately 50 g/L $Cl^-$ and 14 g/L $Cu^{++}$, at an initial pH of 0.5.

The temperature is maintained between 90° C. and 95° C. at atmospheric pressure. During the course of the reaction, the composition changes to approximately 37 g/L $Cu^{++}$ and 50 g/L $Cl^-$ at pH 2.5. Some HCl and NaCl, but no $H_2SO_4$, is added to the solution returning from the copper solvent extraction to compensate for losses.

EXAMPLE (7)

Two Stage Leach Circuit

Figure 7:
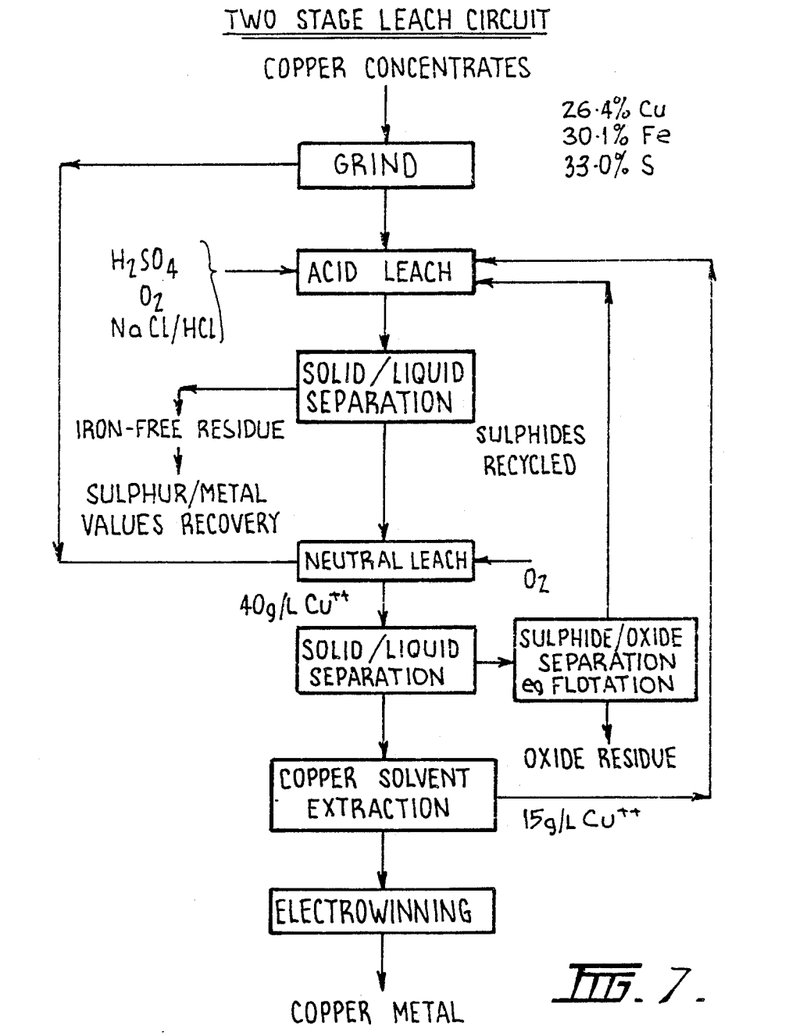
FIG. 7 illustrates the hydrometallurgical contraction of copper from the concentrates of FIG. 5 but using a two-stage leach circuit.

The leach stages of the process illustrated in FIG. 7 are basically the same as those depicted in FIGS. 1-5 except that the pH levels are deliberately maintained in certain regions. Typically the pH of the "acid" leach should be <1.2 with that of the neutral leach being 2-2.5. The pH of the neutral leach stage may be maintained by adding HCl, NaCl and/or $H_2SO_4$ as required. This enables a substantially iron-free residue containing most of the valuable byproduct metals to be obtained directly from the acid leach. This residue may be more amenable to pyrometallurgical treatment, e.g. in a lead smelter, than the bulk residue in Examples 2 to 6.

It will be clearly understood that the invention in its general aspects is not limited to the specific details referred to hereinabove, and that other process examples may be proposed within the scope of the invention as defined by the appended claims.

We claim:

1. A process for the hydrometallurgical recovery of copper from copper-containing sulfide materials, said process comprising the steps of: leaching said materials in an acid solution at a pressure between atmospheric pressure and 25 psi above atmospheric pressure, said acid solution containing cupric, chloride and sulfate ions, said chloride being present in said solution in a concentration of from about 15 grams per liter to about 100 grams per liter; injecting oxygen into said solution while stirring said solution to maintain said materials in suspension in said solution as well as to disperse oxygen in said solution, whereby said copper is leached into solution from said materials in its cupric state.

2. A process according to claim 1, wherein the leaching is carried out in the acid solution at a temperature between 85° C. and 106° C.

3. A process according to claim 1, wherein the pH of the solution is maintained between 4 and 0.5.

4. A process according to claim 3, wherein the pH of the solution is maintained between 1 and 2.

5. A process according to claim 1, wherein the acid solution contains less than 75 grams per liter of $Cl^-$.

6. A process according to claim 1, in which the sulfate ions are added in the form of sulfuric acid.

7. A process according to claim 1, wherein the copper containing sulfide materials are ground to a particle size of 150 μm or less.

8. A process according to claim 1, wherein the oxygen injection is continuous.

9. A process according to claim 1, wherein said process is conducted in a single reaction vessel.

10. A process as claimed in claim 1, in which the copper containing solution is separated from a solid residue of the leaching step, the copper being then partially transferred to an organic solution which is contacted with an acidic sulfate solution into which the copper is partially transferred, the resulting metal bearing sulfate solution being subjected to electrolysis to recover copper therefrom.

11. A process as claimed in claim 1, in which the copper containing sulfide materials also contain zinc which is leached into the solution, wherein the solution is separated from a solid residue of the leaching step, the zinc being then partially transferred into an organic solution which is contacted with an acidic sulfate solution into which the zinc is partially transferred, the resulting metal bearing sulfate solution being subjected to electrolysis to recover the zinc therefrom.

* * * * *

UNITED STATES PATENT AND TRADEMARK OFFICE
CERTIFICATE OF CORRECTION

PATENT NO. : 4,971,662
DATED : NOV. 20, 1990
INVENTOR(S) : SAWYER et al.

It is certified that error appears in the above-identified patent and that said Letters Patent is hereby corrected as shown below:

On the title page:
    Title, line 2, "COOPER" should be --COPPER--.

In [75] Inventors, line 1, "Waganui" should be followed by --New Zealand--;

line 2, "both of Australia" should be --Australia--.

In [73] Assignee, "Associated" should be followed by --Smelter's Proprietary Limited--.

In column 1, line 2 of the title, "COOPER" should be --COPPER--.

Signed and Sealed this

Seventh Day of April, 1992

Attest:

HARRY F. MANBECK, JR.

*Attesting Officer*      *Commissioner of Patents and Trademarks*